Patented Aug. 26, 1952

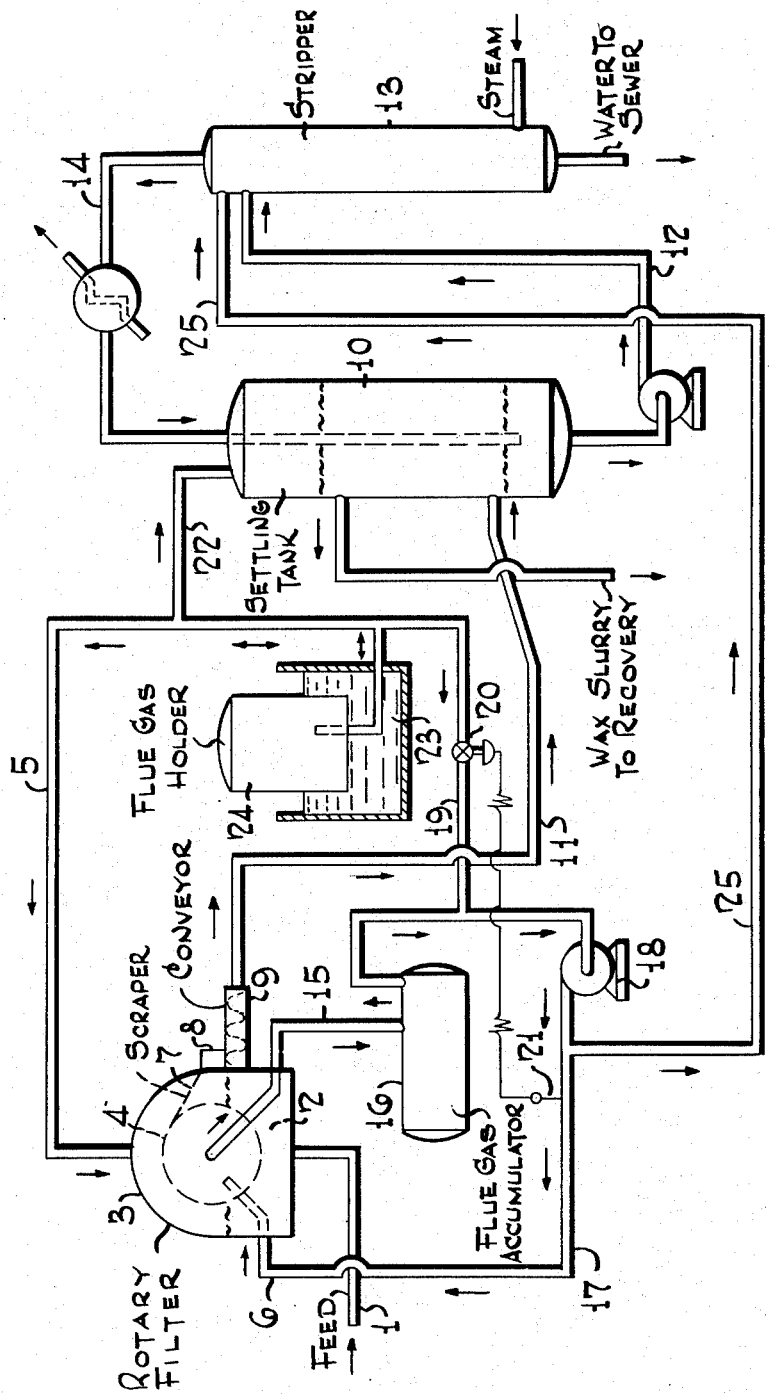

2,608,518

UNITED STATES PATENT OFFICE 2,608,518

REDUCTION OF CORROSION IN SOLVENT DEWAXING PLANTS

Robert L. Greene, Westfield, N. J., assignor to Standard Oil Development Company, a corporation of Delaware Application July 25, 1951, Serial No. 238,518

2 Claims. (Cl. 196—19)

This invention relates to a solvent dewaxing process and more particularly relates to the invention of corrosion in the solvent stripper in those solvent dewaxing processes which do not employ autorefrigeration.

The use of solvent processes for the dewaxing of hydrocarbons wherein autorefrigeration is not employed is quite well known. Such processes generally employ acetone or methyl ethyl ketone as the solvent, although other solvents may be used, if desired. In these processes, oil and solvent are mixed in proper proportions by suitable proportioning devices and charged directly to chillers which may conveniently be of the conventional horizontal, double wall type equipped with scrapers for the removal of precipitated wax from the chiller surface. The chilled solution containing precipitated wax is filtered usually by the rotating pressure leaf or vacuum drum type filters. The wax cake is removed from the filter surface, slurried and pumped to a settling tank where water separates from the wax and is withdrawn. The wax solution is then pumped to solvent recovery equipment.

The fire hazard is reduced by employing a flue gas system to blanket many of the units, particularly the filter, the water separating drum and the solvent recovery unit. The same flue gas is used in loosening the wax cake from the filter surfaces. However, it has been found that excessive corrosion occurs in the solvent recovery system when employing flue gas in this manner, apparently because of excessive accumulation of carbon dioxide from the flue gas in the solvent stripper.

It is the main object of this invention to provide means for overcoming the corrosion in the solvent recovery system.

It is a further object of this invention to provide means for reducing the carbon dioxide content in the top of the solvent stripper.

These and other objects of this invention are accomplished by providing means for introducing a stream of low-carbon dioxide content flue gas into the top of the solvent stripper.

For a further understanding of this invention, reference may be had to the accompanying drawing in which the single figure is an elevational view, generally diagrammatic, showing an apparatus embodying the improvements of the present invention.

Referring now to this drawing, a chilled slurry of wax, oil and solvent is passed by line 1 into the feed bowl 2 of a continuous filter. This filter may be of any well known type having an insulated gas tight pressure casing 3 enclosing a perforated drum 4 having a filter element on its periphery which may be canvas or other suitable material. The drum is conventionally divided into a plurality of segments (not shown) connected to ports whereby each segment is passed through a series of successive steps of cake formation, cake washing and cake discharge. Pressure is maintained between the filter shell 2 and the drum by means of flue gas introduced through line 5 and by means of the vacuum pump 18. Compressed flue gas is introduced through line 6 as blow back gas to loosen the cake and facilitate cake discharge. The cake is removed by means of scraper 7 and passed through discharge port 8 into worm conveyor 9. The pulping action of the conveyor upon the wax renders it easily pumpable. The wax cake, containing as ice any water inadvertently entering the system, is pumped to settling tank 10 by line 11 at a temperature of 120° F. In this tank a water layer, containing solvent dissolved therein, separates from the wax and is withdrawn through line 12 to the top of the stripper 13 where the solvent (and a small amount of water) is removed overhead and returned to the water-separating drum 10 by line 14.

Dewaxed oil, solvent and flue gas discharged from the rotary filter are passed by line 15 to dewaxed oil accumulator 16, from the top of which the flue gas is recycled back to the filter through line 17 by means of pump 18. Whenever the pressure on the discharge side of pump 18 falls below six lbs. per sq. in., make-up flue gas is automatically introduced through line 19 by means of valve 20 and pressure controller 21.

In order to maintain an inert atmosphere over the solvent or solvent and oil or wax mixture, flue gas is introduced to the top of water separating drum 10 through line 22. This atmosphere is maintained at a constant pressure of 6 inches of water by means of flue gas holder 23 consisting of bell 24 floating in oil and adapted to maintain a constant pressure of 6 inches of water on the system.

Since the carbon dioxide normally contained in flue gas to the extent of 2 to 8% is soluble in water and in the solvent used in the dewaxing, the use of flue gas in the filtering system results in the carbon dioxide therein being depleted with the result that the flue gas being recycled through line 17 is low in carbon dioxide. Furthermore, the solvent and water from the filtering unit, already containing carbon dioxide dissolved therein from the flue gas used in the filter, will dissolve still more in the water separating drum due to the presence of the flue gas blanket. Thus, the water and solvent introduced into the top of the solvent stripper 13 will introduce a large amount of carbon dioxide to this equipment with the result that excessive corrosion normally occurs at this point.

In order to combat this corrosion, according to this invention there is provided purge line 25 from the discharge side of pump 18 to the top of solvent stripper 13. This line continuously conveys a portion of the carbon dioxide lean flue gas from filter system to the top of the stripper where it dilutes the gas present therein and reduces corrosion. This gas is contiuously passed from the top of the stripper back into the water separating drum, where it dilutes the gas contained therein. By providing a sufficiently large amount of gas flowing in line 25, the carbon dioxide content of the gas in the top of the stripper can be made to approach that contained in the fresh flue gas, i. e. from 2-5%. Without the use of this purge line, the carbon dioxide content of the gas in stripper 13 rises as high as 57%.

The nature of the present invention having been thus fully set forth and specific examples of the same given, what is claimed as new and useful and desired to be secured by Letters Patent is:

1. In a process for dewaxing hydrocarbons by the use of solvents wherein the oil is diluted with a solvent, chilled and filtered in a filter wherein filtration is effected by maintaining a differential pressure between the oil-wax-solvent mixture and the filtrate side of the filtering element of the filter, wherein the wax cake is loosed from the filter by means of a continuously circulating stream of flue gas, wherein the separated wax cake is slurried and settled to separate water together with dissolved solvent, wherein the water and solvent are passed to a solvent stripping zone and the solvent is returned to the water separating step, wherein the water and solvent is maintained under a flue gas blanket in the water separating step, the method of preventing corrosion in the solvent stripping zone by the carbon dioxide dissolved in the water and solvent in the filtration and water separation steps which comprises passing a portion of the flue gas circulating in the filtering step to the top of the solvent stripping zone.

2. In a process for dewaxing hydrocarbons by the use of solvents wherein the oil is diluted with a solvent, chilled and filtered in a vacuum rotary filter, wherein the wax cake is loosed from the filter by means of a continuously circulating stream of flue gas, wherein the separated wax cake is slurried and settled to separate water together with dissolved solvent, wherein the water and solvent are passed to a solvent stripping zone and the solvent is returned to the water separating step, wherein the water and solvent is maintained under a flue gas blanket in the water separating step, the method of preventing corrosion in the solvent stripping zone by the carbon dioxide dissolved in the water and solvent in the filtration and water separation steps which comprises passing a portion of the flue gas used to loosen the wax cake to the top of the solvent stripping zone.

ROBERT L. GREENE.

No references cited.